United States Patent [19]

Heal

[11] Patent Number: 5,505,511
[45] Date of Patent: Apr. 9, 1996

[54] CABLE END DEVICE

[75] Inventor: Garry Heal, Vernon, Canada

[73] Assignee: Kwik Change Slider Systems, Ltd., Vernon

[21] Appl. No.: 503,583

[22] Filed: Jul. 18, 1995

[30] Foreign Application Priority Data

Nov. 23, 1994 [CA] Canada .................................. 2136465

[51] Int. Cl.⁶ .............................. B66C 1/14; F16G 11/14
[52] U.S. Cl. ........................................ 294/82.14; 294/74
[58] Field of Search ............................ 294/74, 75, 82.11, 294/82.14, 82.17, 82.23; 24/115 R, 136 R; 403/301, 305, 315, 317, 353

[56] References Cited

U.S. PATENT DOCUMENTS

| 1,643,362 | 9/1927 | Ashdown | 294/74 |
| 2,215,023 | 9/1940 | White | 294/74 |
| 3,289,259 | 12/1966 | Laharty | 294/82.14 |
| 3,464,093 | 9/1969 | Laharty | 294/82.14 X |
| 4,653,792 | 3/1987 | Sword | 294/82.14 |

Primary Examiner—Johnny D. Cherry
Attorney, Agent, or Firm—George A. Seaby

[57] ABSTRACT

Bells for use on log skidding cables are often angular and difficult to assemble and disassemble. A simple, streamlined bell for use on a wire cable includes a longitudinally extending passage in one end of the body of the bell for receiving the ferrule on one end of the cable. The large diameter inner end of the passage is closed by a disc which is held in the body by a split pin. A sleeve slidably mounted in the large diameter end of the passage is biased towards the other narrow diameter, closed end of the passage by a helical spring mounted in the sleeve and retained therein by an inwardly extending, annular flange on the outer end of the sleeve. A keyhole slot is provided in the body at the outer end of the passage, whereby the ferrule and the free end of a cable can be inserted into the passage. The tapering free end of a ferrule is inserted into an annular, tapering socket in the outer end of the flange and pushed to move the sleeve towards the disc so that the ferrule can be fully inserted into the passage and rotated into alignment with the passage. When the cable is released, the spring pushes the sleeve, and consequently the ferrule into a locked position in the passage. In order to remove the ferrule and release the end of the cable from the bell, it is merely necessary to reverse the process.

5 Claims, 4 Drawing Sheets 5,505,511

CABLE END DEVICE

BACKGROUND OF THE INVENTION

1. Field of the Invention

This invention relates to a cable bell, and in particular to a cable bell for use in a log skidding cable assembly.

2. Discussion of the Prior Art

Cable bells have long been used in the logging industry. Examples of such devices are described in U.S. Pat. No. 3,289,259, issued to M. L. Laharty on Dec. 6, 1966; U.S. Pat. No. 3,464,093, issued to M. L. Laharty on Sep. 2, 1969; U.S. Pat. No. 4,118,059, issued to W. R. M. Lindsay on Oct. 3, 1978; U.S. Pat. No. 4,601,506, issued to M. G. Hillson on Jul. 22, 1986; U.S. Pat. No. 4,637,643, issued to D. D. Johnson et al on Jan. 20, 1987 and U.S. Pat. No. 5,064,235, issued to M. Lessard on Nov. 12, 1991.

In general, devices of the type in question presently being used in the logging industry are unnecessarily complicated or include projections which tend to catch on brush or on portions of the skidding vehicle. There are two types of bells currently in use, namely a lead bell and a sliding bell. The ends of two separate cables are connected to the ends of the lead bell. The lead bell retains several sliding bells on a main cable connected to the skidding vehicle. Each of the sliding bells and the free end of the lead bell carries a choker cable which can be wrapped around a log or logs. It is common practice to reverse each choker cable on a regular basis to lengthen cable life. If, as is often the case, pins are used to connect the choker cables to the bells and the pins become bent, the reversing of a choker cable or the replacement of a broken cable can be a long and difficult job.

GENERAL DESCRIPTION OF THE INVENTION

An object of the present invention is to provide a solution to the above defined problems in the form of a relatively simple, streamlined cable bell, which is easy to connect and remove from the end of a cable.

Another object of the invention is to provide a cable bell including a small number of simple elements, which can readily be replaced, facilitating the repair of damaged or broken bells.

Accordingly, the present invention relates to a bell for use on a wire cable comprising elongated body means; aperture means in one end of said body means extending substantially perpendicular to the longitudinal axis of said body means for receiving a first portion of a cable; longitudinally extending passage means in said body means having a large diameter end and a small diameter end for receiving a ferrule on one end of the cable, the ferrule having a tapering outer free end; a first closed end of said passage means defining a first stop between said aperture means and said passage means; a second closed end of said passage means defining the other end of said body means; slot means in one side of said body means intersecting said second close end for admitting said one end of a cable into said passage means; said slot means having a large diameter inner end for admitting the ferrule on an end of the cable into said passage means; sleeve means slidable in the large diameter first end of said passage means; socket means in one end of said sleeve means facing said second closed end for receiving the ferrule on said one end of the cable; and compressible spring means in said sleeve means extending between said socket means and said first closed end of the passage means biasing said sleeve means towards said other end of the body means, whereby, when a ferrule is inserted into said large diameter inner end of said slot means and pressed against said socket means, the sleeve means moves towards said first closed end permitting complete insertion of the ferrule into the body means of the bell with said free end of the cable, and release of pressure on the sleeve means permits said spring means to press said sleeve means against the ferrule, and consequently the ferrule against said second end of the body means to retain the ferrule and the cable in the bell.

BRIEF DESCRIPTION OF THE DRAWINGS

The invention is described hereinafter in greater detail with reference to the accompanying drawings, which illustrate a preferred embodiment of the invention, and wherein.

Wherever possible the same reference numerals have been used to identify the same or similar elements in the drawings.

DESCRIPTION OF THE PREFERRED EMBODIMENT

Figure 1:
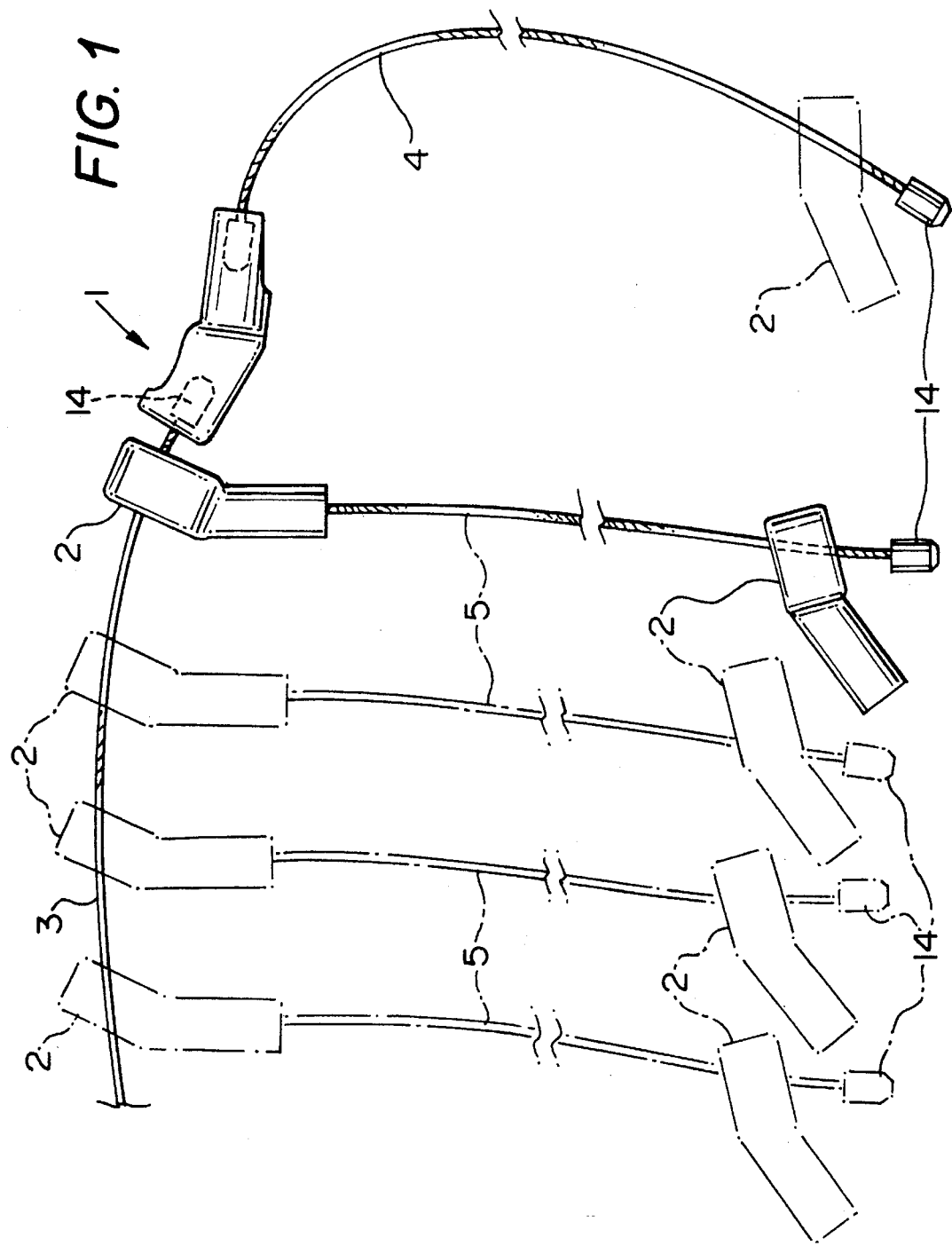
FIG. 1 is a schematic side view of a skidder assembly incorporating bells in accordance with the present invention.
Figure 2:
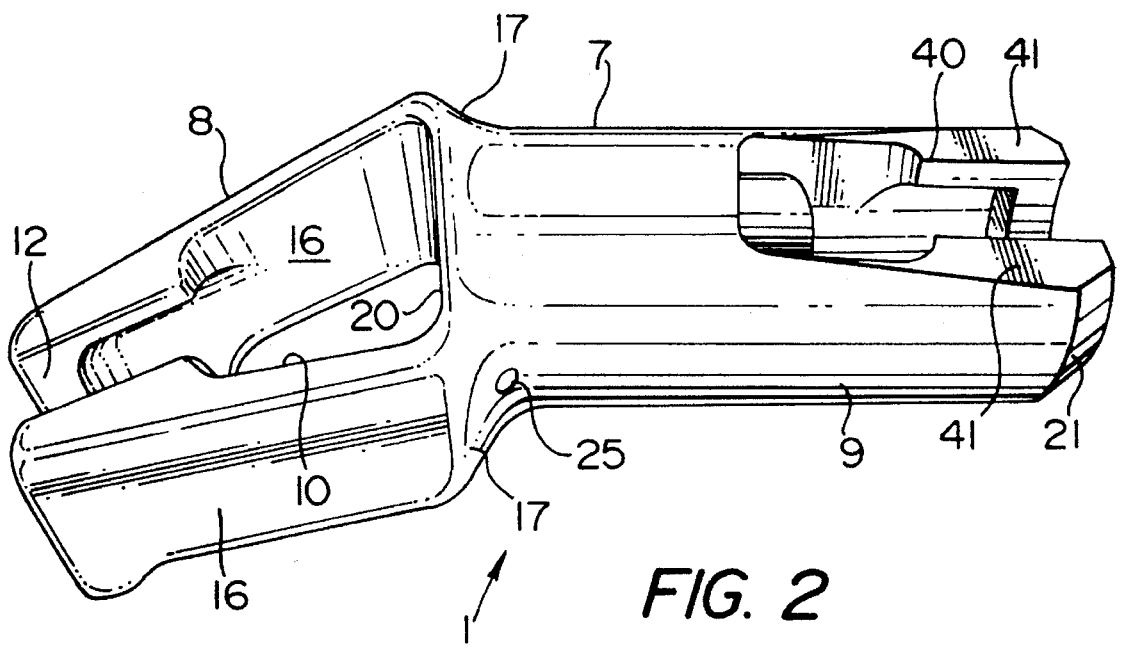
FIG. 2 is a perspective view of a lead cable bell in accordance with the present invention.
Figure 3:
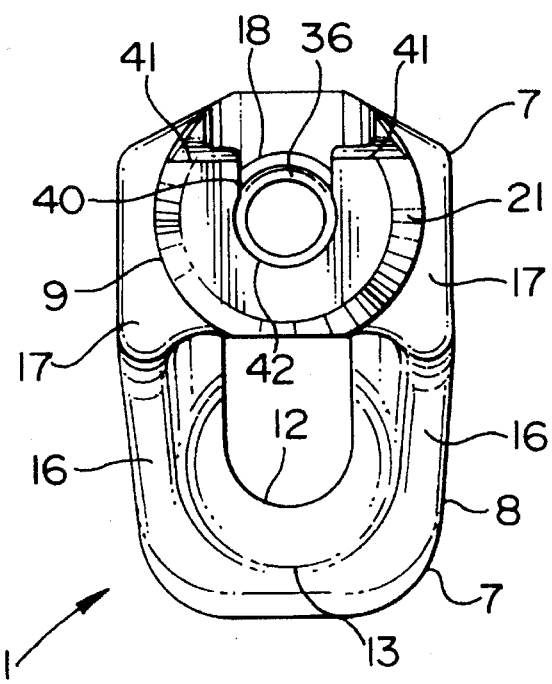
FIG. 3 is an end view of the cable bell of FIG. 2 as viewed from the right of FIG. 2.
Figure 4:
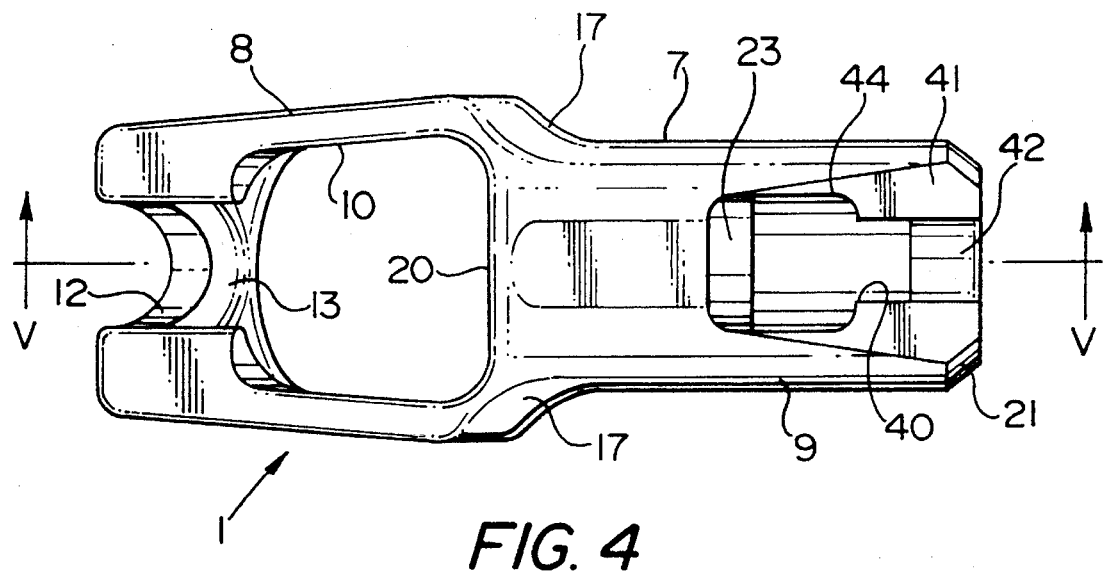
FIG. 4 is a top view of the cable bell of FIGS. 2 and 3.

With reference to FIG. 1, the following detailed description relates to two bells, namely a lead bell generally indicated at 1 and a sliding bell 2. The lead bell 1 is connected to the outer or trailing end of a main cable 3, which passes through a fairlead to a winch on a skidder (not shown). The lead bell 1 is used to connect a shorter choker cable 4 to the main cable 3, and to retain a plurality of sliding bells 2 on the trailing end of the main cable 3. A plurality of other choker cables 5 are connected to the sliding bells 2, and a second bell 2 is slidably mounted on each of the cables 4 and 5. The use of this assembly is described in greater detail hereinafter.

Referring to FIGS. 2 to 5 a lead cable bell 1 in accordance with the present invention includes an elongated body 7 which when viewed from the side (FIG. 4) defines a shallow inverted V. One section 8 of the body is generally rectangular in cross section, tapering outwardly and downwardly slightly from the longitudinal axis of the other, generally cylindrical section 9.

A rectangular aperture 10 extends through the section 8 for receiving one end of the cable 3. A U-shaped notch 12 is provided in the otherwise closed end 13 of the section 8 for receiving the cable end. A ferrule 14 (FIG. 1) on the end of the cable 3 is inserted into the aperture 10 and hammered into position so that the longitudinal axes of the cable 3 and of the section 8 are more or less aligned. The converging side walls 16 of the section 8 grip the ferrule 14 to retain it in the bell.

The section 9 defining the other end of the bell 1 is connected to the section 8 by tapering shoulders 17 on the sides of the bell. As mentioned above, such other section 9 of the bell 1 is generally cylindrical with an elongated passage 18 extending between an open inner end 20 and a closed outer end 21. The open inner end 20 is closed by a disc-shaped plug 23 which is secured in the body 1 by a split pin 24. The plug 23 is placed in open end 20 of the body 7 and the pin 24 is hammered into aligned holes 25 (FIG. 2) and 26 (FIGS. 4 and 5) in the sides of the body 7 and in the plug 23, respectively. The hole 26 extends diametrically through the plug for alignment with the holes 25 in the sides of the body 7.

Figure 5:
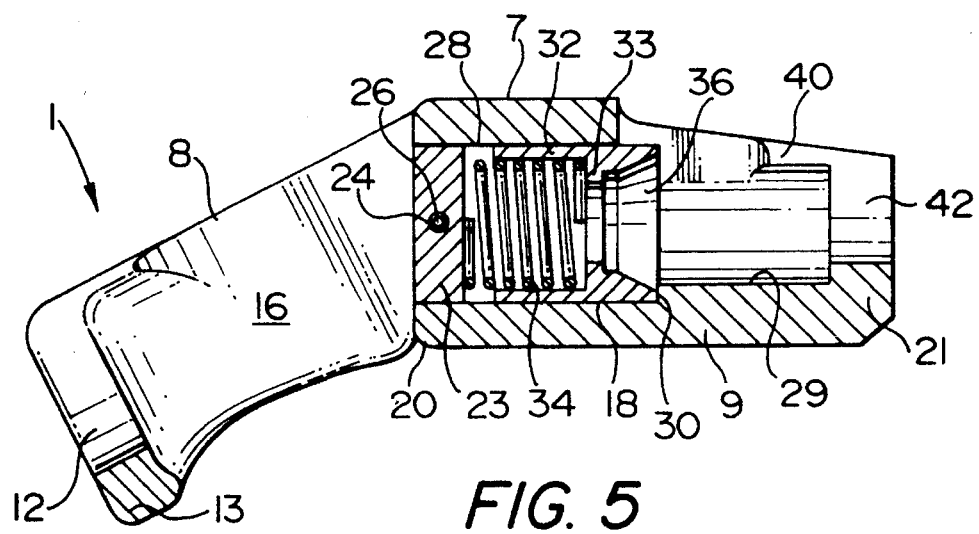
FIG. 5 is a cross section taken generally along line V—V of FIG. 4.
Figure 6:
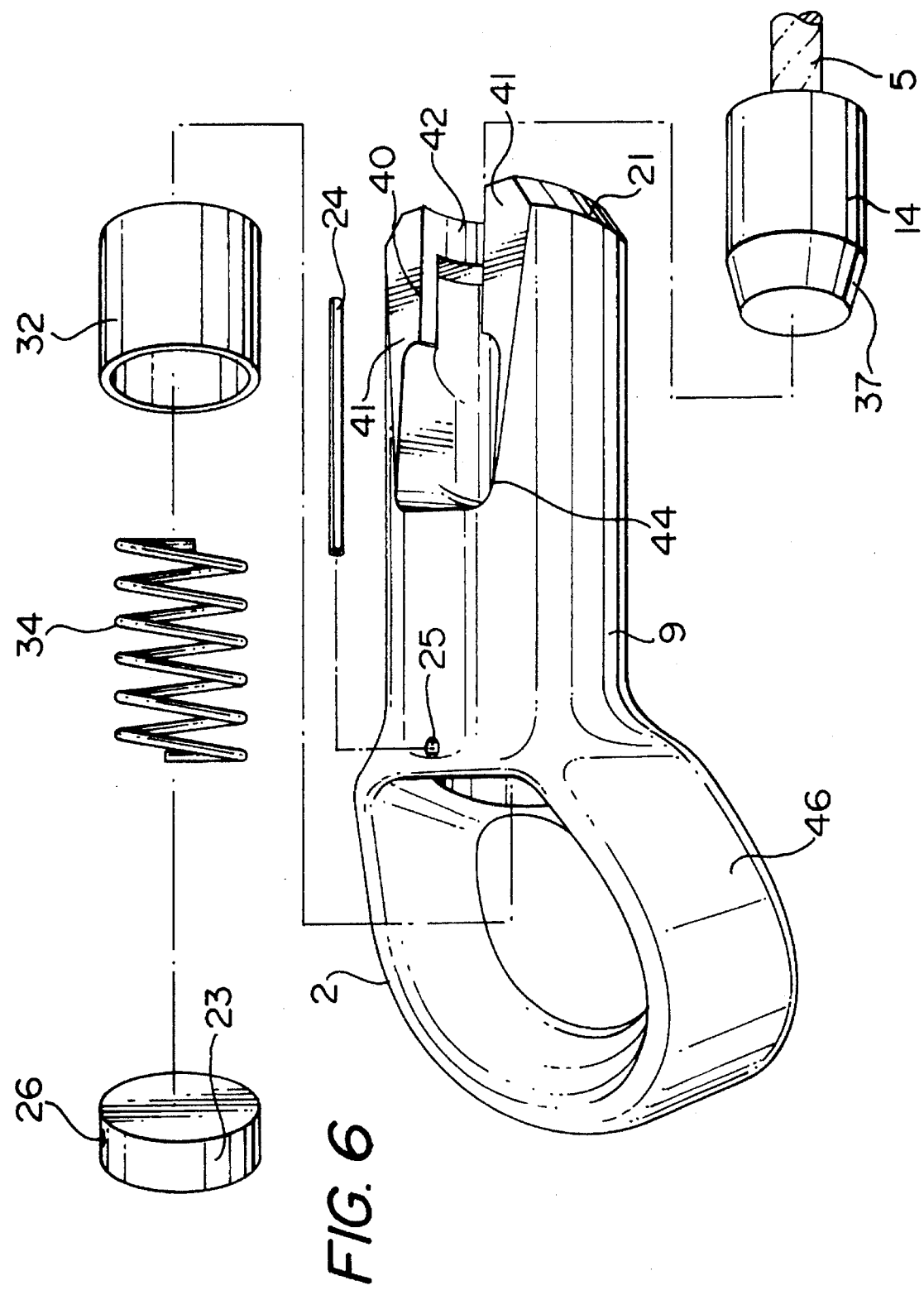
FIG. 6 is an exploded isometric view of a sliding cable bell in accordance with the present invention.

As best shown in FIG. 5, the passage 18 includes a large diameter inner end 28 adjacent to the plug 23 separated from a smaller diameter outer end 29 by a shoulder 30. A sleeve 32 is slidably mounted in the large diameter inner end 28 of the passage 18. Inward movement of the sleeve 32 is limited by the plug 23 and outward movement of the sleeve is limited by the shoulder 30. A radially inwardly extending flange 33 on the outer end of the sleeve 32 retains a helical compression spring 34 in the sleeve. One end of the spring 34 abuts the plug 23. The spring 34 biases the sleeve 32 outwardly against the shoulder 30. It will be appreciated that the spring could be a plug formed of a resilient, compressible material such as rubber. As illustrated in FIG. 6, during assembly of a bell, the sleeve 32 is inserted into the body 7, and is followed by the spring 34 and the plug 23. The outer side of the flange 33 includes an inwardly tapering, annular recess defining a socket 36 for receiving the tapering outer end 37 of a ferrule 14 on one end of a cable 4 or 5 (FIG. 1).

The ferrule 14 and the cable 4 or 5 are admitted into the passage 18 via an elongated slot 40 in the outer end of the section 9 of the body. The area 41 of the body section 9 around the slot 40 is chamfered outwardly towards the outer end 21 of the body for facilitating access to the slot 40. The outer end of the slot 40 defines a generally U-shaped groove 42 in the bevelled end 21 of the body 1. The groove 42 and the outer end of the slot 40 are only slightly wider than the diameter of the cable 4 or 5, but smaller than the diameter of the ferrule 14. The generally rectangular inner end 44 of the slot 40 is sufficiently large to receive the ferrule 14 if the latter is inserted at an acute angle to the longitudinal axis of the passage 18 pressed against the socket 36 to move the sleeve 32, and then pivoted inwardly to move the ferrule 14 fully into the passage 18. Once in the passage 18, with the spring 34 compressed, the cable end is released, whereby the spring 34 moves the sleeve 32 and the ferrule 14 outwardly, pressing the latter against the outer end 21 of the body 1. Because the narrow diameter end 29 of the passage 18 is only slightly larger than that of the ferrule 14, the cable end is securely held in the bell. In order to disconnect the cable 4 or 5 from the sliding bell, the procedure is reversed, i.e. the cable is grasped and pressed into the body 7 to move the sleeve 32 inwardly away from the shoulder 30, the cable end and the ferrule are pivoted sideways and then pulled out of the bell.

The sliding bell of FIG. 6 is similar to the bell of FIGS. 1 to 4 except that one end 46 thereof is in the form of a loop for sliding a cable 3, 4 or 5. The other end 9 of the body of the bell 2 is identical to the end 9 of the lead bell 1, except that the pin 24 is inserted in aligned holes 25 (one shown) in the top and bottom of the body for holding the disc 233 in position.

Referring again to FIG. 1, in use, a plurality of sliding bells 2 with choker cables 4 attached thereto are mounted on a main cable 3. The main cable 3 is mounted on the winch of a skidder for towing logs. A lead bell 1 is connected to the trailing or free end of the cable 3 to retain the sliding bells 2 on the cable 3. A choker cable 4 is connected to the outer free end of the lead bell 1. The lead and sliding bells are usually pushed into the fairlead of the skidder during travel to a logging site. When a log location is reached, the bells 1 and 2 are pulled out of the fairlead. Because the bells are streamline, they tend to slide out of the fairlead relatively smoothly. The cable 4 is wrapped around one end of a log or logs (not shown), and the ferrule 14 on the free end of the cable is inserted into the sliding bell 2 on the cable 4 to form a loop around the log(s). The process is repeated with the cable 5, and the resulting load of logs is towed by the skidder.

I claim:

1. A bell for use on a wire cable comprising elongated body means; aperture means in one end of said body means extending substantially perpendicular to the longitudinal axis of said body means for receiving a first portion of a cable; longitudinally extending passage means in said body means having a large diameter end and a small diameter end for receiving a ferrule on one end of the cable, the ferrule having a tapering outer free end; a first closed end of said passage means defining a first stop between said aperture means and said passage means; a second closed end of said passage means defining the other end of said body means; slot means in one side of said body means intersecting said second closed end for admitting said one end of a cable into said passage means; said slot means having a large diameter inner end for admitting the ferrule on an end of the cable into said passage means; sleeve means slidable in the large diameter first end of said passage means; socket means in one end of said sleeve means facing said second closed end for receiving the ferrule on said one end of the cable; and compressible spring means in said sleeve means extending between said socket means and said first closed end of the passage means biasing said sleeve means towards said other end of the body means, whereby, when a ferrule is inserted into said large diameter inner end of said slot means and pressed against said socket means, the sleeve means moves towards said first closed end permitting complete insertion of the ferrule into the body means of the bell with said free end of the cable, and release of pressure on the sleeve means permits said spring means to press said sleeve means against the ferrule, and consequently the ferrule against said second end of the body means to retain the ferrule and the cable in the bell.

2. A bell according to claim 1, including shoulder means between said first and second ends of said passage means, said shoulder means defining a second stop for limiting movement of said sleeve means towards said second end of said passage means.

3. A bell according to claim 2, wherein said sleeve means is hollow, including annular, inwardly extending flange means proximate said one end of said sleeve means, said spring means extending between said first closed end of said passage means and said flange means on one side thereof, the other side of said flange means defining said socket means.

4. A bell according to claim 3, wherein said first stop includes disc means removably mounted in and closing said second end of said passage means.

5. A bell according to claim 4, wherein said socket means is an inwardly tapering recess in said flange means facing said other end of said body means for receiving a tapering free end of the ferrule.

* * * * *